United States Patent [19]

Woodley

[11] Patent Number: 4,599,130
[45] Date of Patent: Jul. 8, 1986

[54] SPLICING TAPE DISPENSER-APPLICATOR

[75] Inventor: George M. Woodley, Shrewsbury, Mass.

[73] Assignee: King Instrument Corporation, Westboro, Mass.

[21] Appl. No.: 718,877

[22] Filed: Apr. 2, 1985

[51] Int. Cl.⁴ .................... B31F 5/06; B65H 69/06
[52] U.S. Cl. ............................... 156/497; 156/506; 156/518; 156/519; 242/56 R; 242/58.1
[58] Field of Search ............... 156/157, 506, 518, 520, 156/521, 497, 519, 568, 505; 242/56 R, 58.1

[56] References Cited

U.S. PATENT DOCUMENTS

| | | | |
|---|---|---|---|
| 3,625,799 | 12/1971 | Way | 156/518 |
| 3,676,266 | 7/1972 | Jensen et al. | 156/521 |
| 3,878,022 | 4/1975 | Davis | 156/521 |
| 4,475,970 | 10/1984 | Farrow et al. | 156/157 |
| 4,478,674 | 10/1984 | Clark | 156/505 |

Primary Examiner—Michael Wityshyn

[57] ABSTRACT

A novel splicing tape dispenser-applicator comprises an actuator assembly, an applicator assembly, and a pawl assembly. The actuator assembly includes an operating member which is adapted to reciprocate along a selected path, and the applicator assembly is mounted to the operating member of the actuator assembly whereby it can reciprocate between a first retracted position and a second extended position. The applicator assembly comprises a rotatable pentagonal applicator wheel coupled to a rotatable pentagonal ratchet wheel. The pawl assembly includes two pawls arranged to engage the ratchet wheel so that when the applicator assembly moves from its first retracted position to its second extended position, the first pawl will cause the ratchet wheel to advance the applicator wheel one-half face in a predetermined direction, and when the applicator assembly moves from its second extended position to its first retracted position, the second pawl will cause the ratchet wheel to advance the applicator wheel another one-half face in the same predetermined direction. The applicator wheel in its first retracted position is disposed so that one of its corners is aligned with a reciprocating cutter blade, and the applicator assembly in its second extended position is disposed so that one of its faces is positioned so as to squarely engage a splicing block disposed directly beneath the dispenser-applicator. Additionally, means are provided so that suction is selectively applied to apertures in the several faces of the applicator wheel.

13 Claims, 24 Drawing Figures

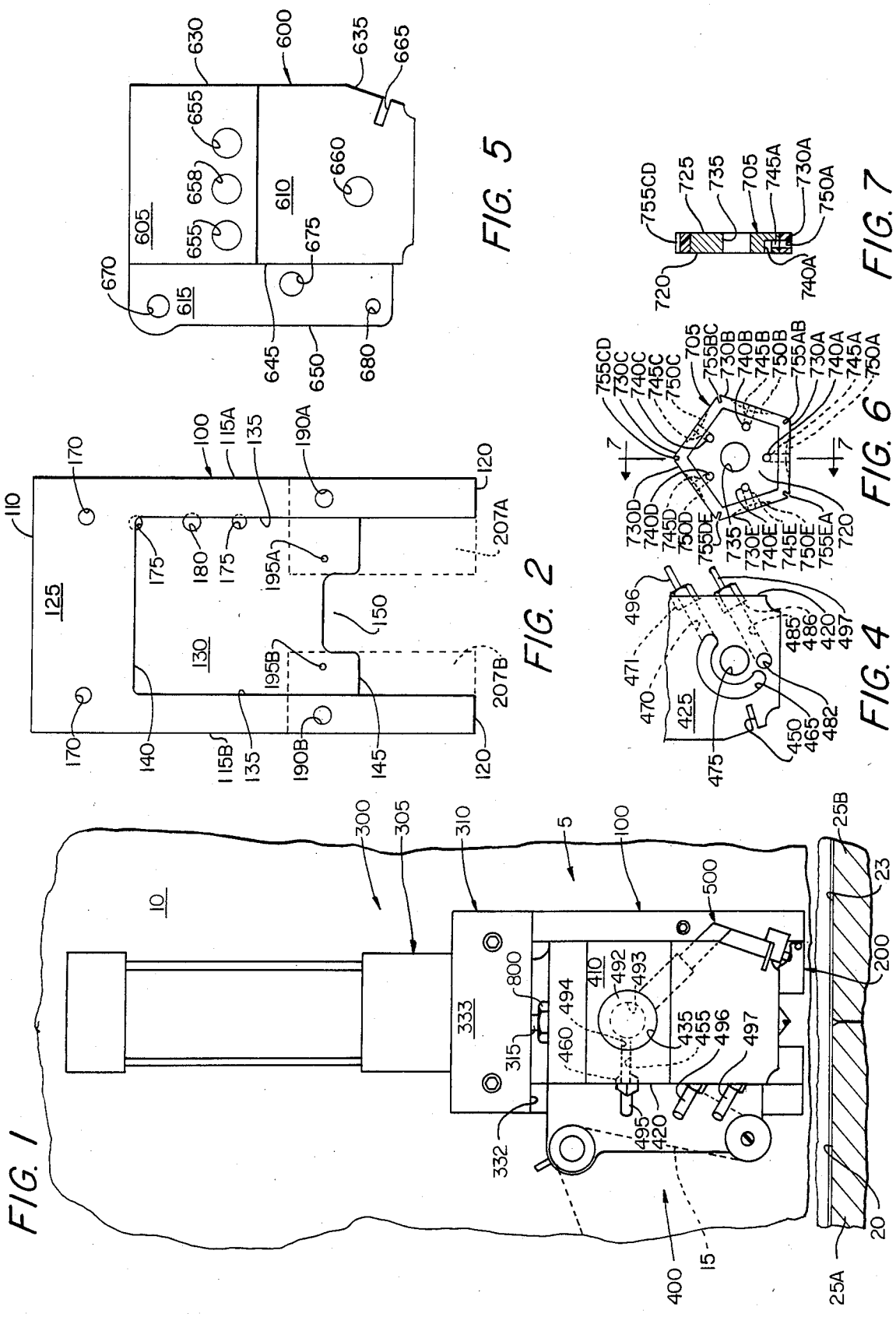

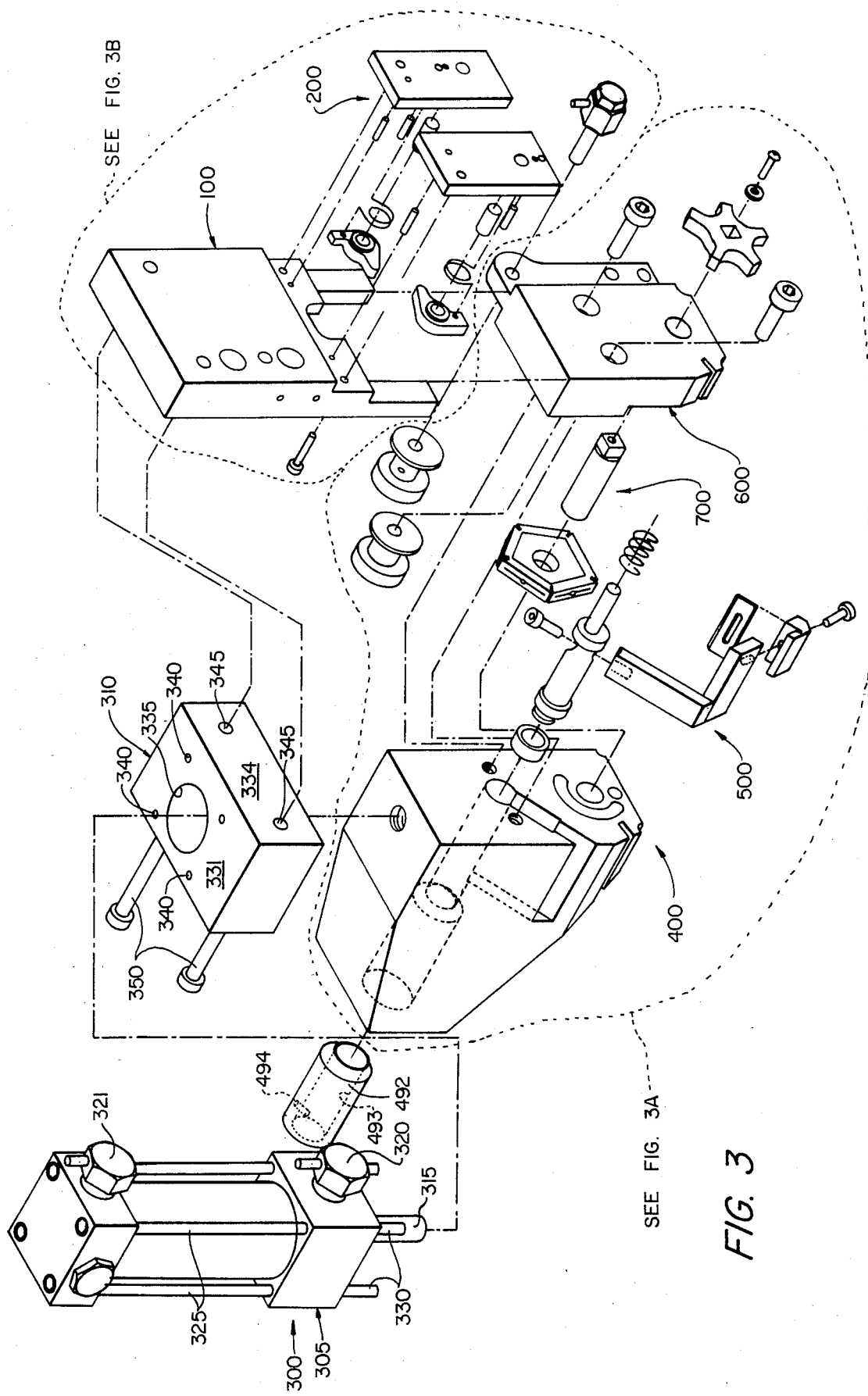

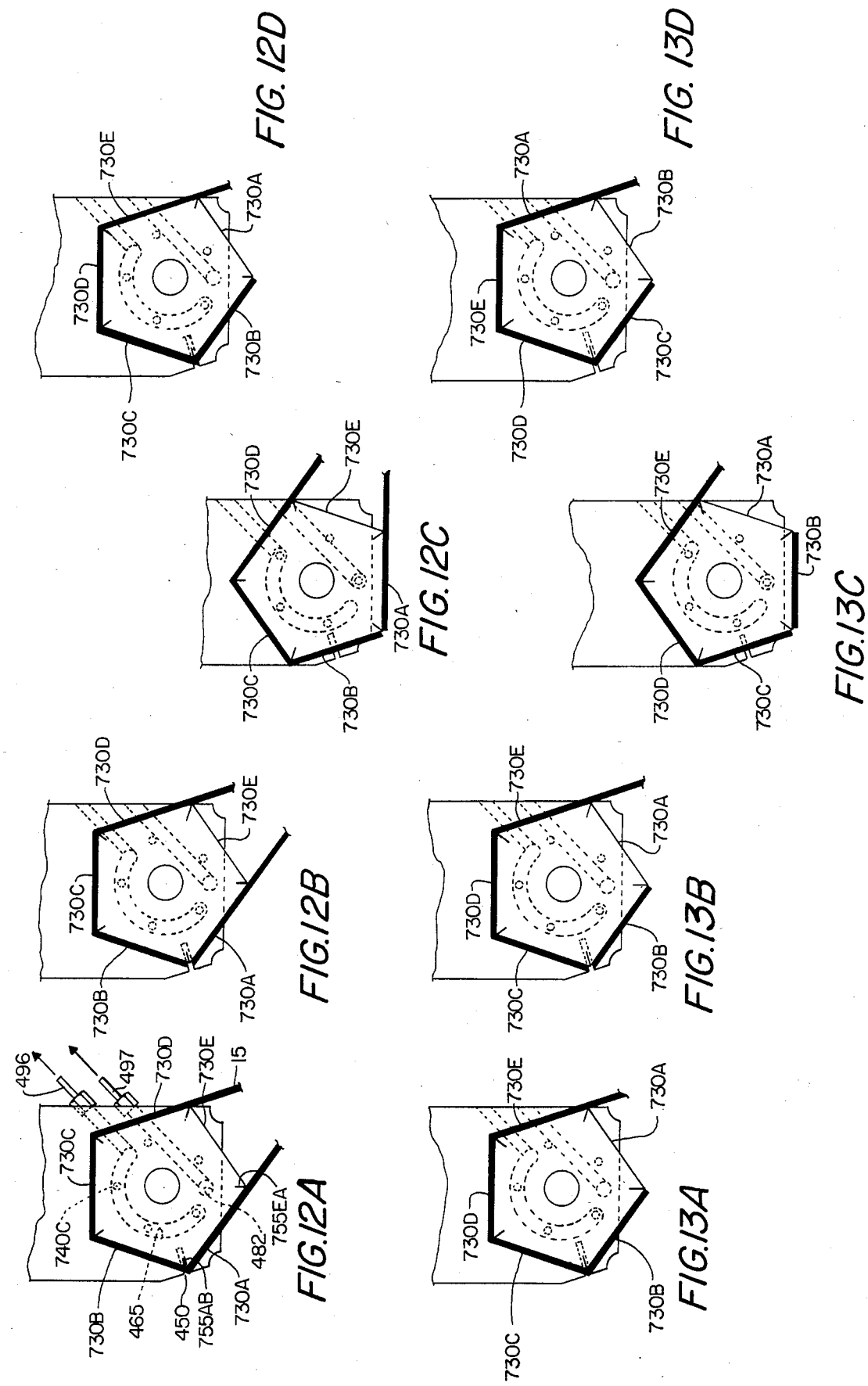

SPLICING TAPE DISPENSER-APPLICATOR

FIELD OF THE INVENTION

This invention relates to tape winding machines in general, and more particularly to splicing tape dispenser-applicators of the sort typically employed in tape winding machines.

BACKGROUND OF THE INVENTION

Tape winding machines are well known in the art. Such machines are used to transfer magnetic recording tape of the sort used in audio or video applications from the large supply reels typically prepared during tape manufacture onto the smaller hubs commonly employed in tape cassettes. See, for example, U.S. Pat. Nos. 3,637,153 (King), 3,814,343 (Bennett et al.), 3,940,080 (Bennett), 3,964,100 (Bennett et al.), 3,997,123 (King), 3,917,184 (King), 4,061,286 (King et al.), 3,753,834 (King), and 4,377,111 (Kincheloe et al.). Such tape winding machines typically receive a pair of hubs connected together by a leader tape, sever the leader tape into two sections, splice virgin or prerecorded magnetic supply tape onto the leader tape section attached to a first of the hubs, wind a predetermined amount of magnetic supply tape onto that hub, sever the magnetic supply tape so that the wound magnetic supply tape has a trailing end, and then splice the trailing end of the wound magnetic supply tape onto the leader tape section attached to the second of the hubs. Machines are known for conducting this tape splicing and winding operation either before the hubs have been mounted in a cassette or, alternatively, after the hubs have been mounted in a cassette.

Machines of the sort described above typically employ splicing tape dispenser-applicators (also known simply as "splicers") to splice the supply and leader tapes together during the splicing operations described above.

One preferred type of splicing tape dispenser-applicator now in common use, and described and illustrated in detail in U.S. Pat. No. 3,753,835 (King), uses a feed roll mechanism to advance a length of splicing tape to a position directly beneath a reciprocating plunger assembly. The reciprocating plunger assembly severs the advanced length of splicing tape from the remainder of the tape on the roll and thereafter presses the severed piece of splicing tape against the two subject tapes which are waiting to be spliced together. The splicing tape then serves to effect the splice between the two subject tapes.

An improved version of the splicing tape dispenser-applicator of U.S. Pat. No. 3,753,835 is described and illustrated in U.S. Pat. No. 4,364,791 (Kincheloe).

Unfortunately, the splicing tape dispenser-applicators described and illustrated in U.S. Pat. Nos. 3,753,835 and 4,364,791 suffer from a number of disadvantages. First, they are relatively bulky devices and occupy a relatively large "footprint" on the front panel of the tape winding machine. Second, the dispenser-applicators have a relatively complex design. As a result, they are relatively difficult and expensive to produce. Third, they require frequent and time-consuming maintenance in order to keep them in good running condition, so that operating costs are increased and available operating time is decreased. Fourth, their feed roll mechanisms operate to advance the lengths of fresh splicing tape to their plunger assemblies for cutting by pushing the lengths forward to a position beneath the reciprocating plunger assemblies. While such an arrangement tends to work well enough with relatively wide splicing tape, since the width of the tape serves to give the tape some stability, it sometimes fails to operate properly with relatively narrow splicing tape, which may buckle on itself rather than advance properly. This can result in the application of a defective splice or, even worse, it can halt the operation of the entire tape winding machine. And lastly, it is a relatively difficult and time-consuming task to hand-thread the splicing tape into the dispenser-applicators of U.S. Pat. Nos. 3,753,835 and 4,364,791, as must be done whenever a fresh roll of splicing tape is required.

Another preferred type of splicing tape dispenser-applicator, described and illustrated in detail in U.S. Pat. No. 4,462,858 (Goguen), uses a reciprocating feed block (equipped with adjustable suction means) to advance a length of splicing tape to a position directly beneath a reciprocating plunger assembly. As in the splicers of U.S. Pat. Nos. 3,753,835 and 4,364,791, the reciprocating plunger assembly of U.S. Pat. No. 4,462,858 severs the advanced length of splicing tape from the remainder of the tape on the roll and thereafter presses the severed piece of splicing tape against the two subject tapes which are waiting to be spliced together.

Unfortunately, the splicer of U.S. Pat. No. 4,462,858 shares some of the disadvantages associated with the splicers of U.S. Pat. Nos. 3,753,835 and 4,364,791, notably those of substantial bulk, complex design, and frequent and time-consuming maintenance.

Another form of splicer is manufactured by American Multimedia Inc./Concept Design of Burlington, N.C. (hereinafter referred to simply as "AMI/CD"). The AMI/CD device utilizes a rotating, reciprocating square "wheel" to apply a length of splicing tape to the two subject tapes which are waiting to be spliced. More particularly, that device comprises a four-sided wheel and complex valving means adapted to selectively apply either suction or pressurized air to openings formed in the wheel's four faces; the suction is used to maintain the splicing tape against the wheel faces, while the pressurized air is used to repel the splicing tape from the wheel faces. The valving means is adapted to apply suction to at least some of the wheel's faces at all times, so as to keep the splicing tape engaged with the wheel. The splicing tape is advanced forward by indexing the wheel one face at a time via complex advancing means, and successive lengths of splicing tape are deployed by first cutting the splicing tape along one corner of the wheel so that the splicing tape on one face is severed from the remainder of the splicing tape, and thereafter reciprocating the wheel towards and away from the two subject tapes which are waiting to be spliced so that the severed length of splicing tape is pressed against the two subject tapes. The suction holding the severed piece of splicing tape to the square wheel is terminated as soon as the splicing tape engages the two subject tapes, and a brief blast of pressurized air is thereafter applied to blow the splice flat, so that the severed piece of splicing tape will remain in engagement with the subject tapes as the square wheel is withdrawn.

Unfortunately, the splicing tape dispenser-applicator of AMI/CD also shares many of the disadvantages associated with the splicing tape dispenser-applicators of U.S. Pat. Nos. 3,753,835, 4,364,791 and 4,462,858, i.e., those of substantial bulk, complex design, and frequent and time-consuming maintenance. In addition, the splicing tape dispenser-applicator of AMI/CD is believed to suffer from the additional problems of slow speed and poor reliability.

Yet another splicing tape dispenser-applicator is manufactured by Electro Sound of Sunnyvale, Calif. This device is believed to be similar to the foregoing AMI/CD splicer, except that it uses a hexagonal wheel wherein the faces of the wheel are made of rubber and the corners of the wheel are made of a hardened material such as steel.

The Electro Sound splicer is believed to suffer from substantially the same deficiencies as the AMI/CD splicer.

Still other prior art relating to splicing tape dispenser-applicators is described and illustrated in U.S. Pat. Nos. 3,117,051 (Kornblum), 4,174,247 (Dyck), 4,181,558 (Neubronner) and 4,328,066 (Kiuchi et al.).

OBJECTS OF THE INVENTION

The principal object of the present invention is to provide a novel splicing tape dispenser-applicator which eliminates most, if not all, of the numerous disadvantages associated with prior art splicing tape dispenser-applicators.

In particular, one of the objects of the present invention is to provide a splicer which is compact and which occupies a relatively small "footprint" on the front panel of the tape winding machine.

Another object of the present invention is to provide a splicing tape dispenser-applicator which has a relatively simple design, so that it is relatively easy to manufacture and relatively inexpensive to produce.

Still another object of the present invention is to provide a splicer which has a relatively simple operating sequence, so that it is relatively easy to integrate the device with the tape winding machine's control apparatus.

Yet another object of the present invention is to provide a splicing tape dispenser-applicator which is relatively fast and reliable in operation.

Another object of the present invention is to provide a splicing tape dispenser-applicator which requires a minimum of maintenance in order to keep it in good running condition.

Still another object of the present invention is to provide a splicing tape dispenser-applicator which does not suffer from unreliable tape advance, especially when utilizing relatively narrow splicing tape.

Yet another object of the present invention is to provide a splicer arranged so that it is a relatively fast and simple task to reload it with a fresh roll of splicing tape.

SUMMARY OF THE INVENTION

These and other objects of the present invention are achieved by a novel splicing tape dispenser-applicator or splicer which comprises a mounting plate, a pawl assembly, an actuator assembly, and an applicator assembly.

The mounting plate attaches to the front panel of the tape winding machine and provides a support for the remainder of the dispenser-applicator.

The pawl assembly is attached to the mounting plate and includes first and second pawls, the first pawl being adapted to yield in a downward direction but not in an upward direction, and the second pawl being adapted to yield in an upward direction but not in a downward direction.

The actuator assembly is mounted to the mounting plate and includes an actuator which is adapted to reciprocate its operating member in a vertical direction between the two pawls.

The applicator assembly is mounted to the free end of the actuator's operating member so that it can reciprocate between a first retracted position and a second extended position. The applicator assembly comprises a rotatable pentagonal applicator wheel and a rotatable pentagonal ratchet, with the applicator wheel and the ratchet being coupled together so that rotational movement of the ratchet causes corresponding rotational movement of the applicator wheel. The ratchet is positioned relative to the pawls so that when the applicator assembly advances from its first retracted position to its second extended position, engagement of the ratchet with the first pawl will advance the applicator wheel one-half face in a predetermined direction, and when the applicator assembly advances from its second extended position to its first retracted position, engagement of the ratchet with the second pawl will advance the applicator wheel another one-half face in the same predetermined direction. As a result of the foregoing construction, each complete reciprocation of the applicator assembly steps the applicator wheel forward one complete face. In addition to the foregoing, the applicator assembly is arranged so that when the applicator assembly is disposed in its first retracted position, the applicator wheel will be disposed so that one of its corners will be presented downwards and another of its corners will be aligned with a reciprocating cutter blade, and when the applicator assembly is disposed in its second extended position, the applicator wheel will be disposed so that one of its faces will be presented downwards so that the face may squarely engage a splicing block disposed directly beneath the dispenser-applicator.

Air passageways are formed in the applicator assembly and are appropriately sized and shaped so that when the applicator assembly is disposed in its first retracted position, suction applied to a first fitting will automatically be applied to the three applicator wheel faces which will next engage the splicing block but not to any other faces, and suction applied to a second fitting will automatically not be applied to any applicator wheel faces, and when the applicator assembly is disposed in its second extended position, suction applied to the first fitting will automatically be applied to the three applicator wheel faces which will next engage the splicing block but not to any other faces, and suction applied to a second fitting will automatically be applied to the applicator wheel face then engaging the splicing block but not to any other faces.

The splicer of this invention operates according to the following cycle. At the start of the cycle, the applicator assembly is disposed in its first retracted position, so that one of the applicator wheel's corners is presented downwards and another of its corners is aligned with the reciprocating cutter blade. In addition, suction is continuously applied to the first and second fittings, so that suction is established on the three applicator wheel faces which will next engage the splicing block. Splicing tape is held to these three faces of the applicator wheel by this suction. Then, while the applicator assembly is in its first retracted position, the cutter blade is activated so that the portion of splicing tape disposed on the face which will next engage the splicing block is severed from the remainder of the splicing tape. Next, the actuator is energized so that the applicator assembly moves downward from its first retracted position into its second extended position, thereby indexing the applicator wheel forward one-half face so that the face carrying the severed piece of splicing tape moves into position to squarely engage the splicing block. As this wheel indexing occurs, the face carrying the severed piece of splicing tape moves out of communication with the first fitting and into communication with the second fitting, thus maintaining the suction which keeps the severed piece of splicing tape attached to the applicator wheel. When the applicator assembly reaches its second extended position, the severed piece of splicing tape is pressed down against the two subject tapes waiting on the splicing block to be spliced, causing the severed piece of splicing tape to securely attach itself to the two subject tapes. Thereafter, the actuator assembly is energized once again so that the applicator assembly moves upward from its second extended position into its first retracted position, thereby leaving the severed piece of splicing tape deployed on the splicing block and indexing the applicator wheel forward one-half face again.

The foregoing sequence is repeated whenever it is desired to lay down a splice.

BRIEF DESCRIPTION OF THE DRAWINGS

Still other objects and features of the present invention will be more fully disclosed or rendered obvious in the following detailed description of the preferred embodiment of the invention, which is to be considered together with the accompanying drawings wherein like numbers refer to like parts and further wherein:

FIG. 1 is a fragmentary front elevational view illustrating the novel splicing tape dispenser-applicator which comprises the preferred embodiment of the present invention, with the device's applicator assembly being shown in its first retracted position;

FIG. 2 is a front elevational view of the same dispenser-applicator's mounting plate, with portions of the pawl assembly being shown in phantom;

FIG. 3 is an exploded rear isometric view of the same dispenser-applicator;

FIG. 4 is a fragmentary rear elevational view showing a portion of the same dispenser-applicator's applicator assembly;

FIG. 5 is a front elevational view of a portion of the same dispenser-applicator's applicator assembly;

FIG. 6 is a front elevational view of the same dispenser-applicator's applicator wheel;

FIG. 7 is a sectional view taken along line 7—7 of FIG. 6;

FIGS. 12A–12D and 13A–13D are two series of rear elevational views of a portion of the same dispenser-applicator's applicator assembly, illustrating operation of the device;

DETAILED DESCRIPTION OF THE PREFERRED EMBODIMENT

Figure 3A:
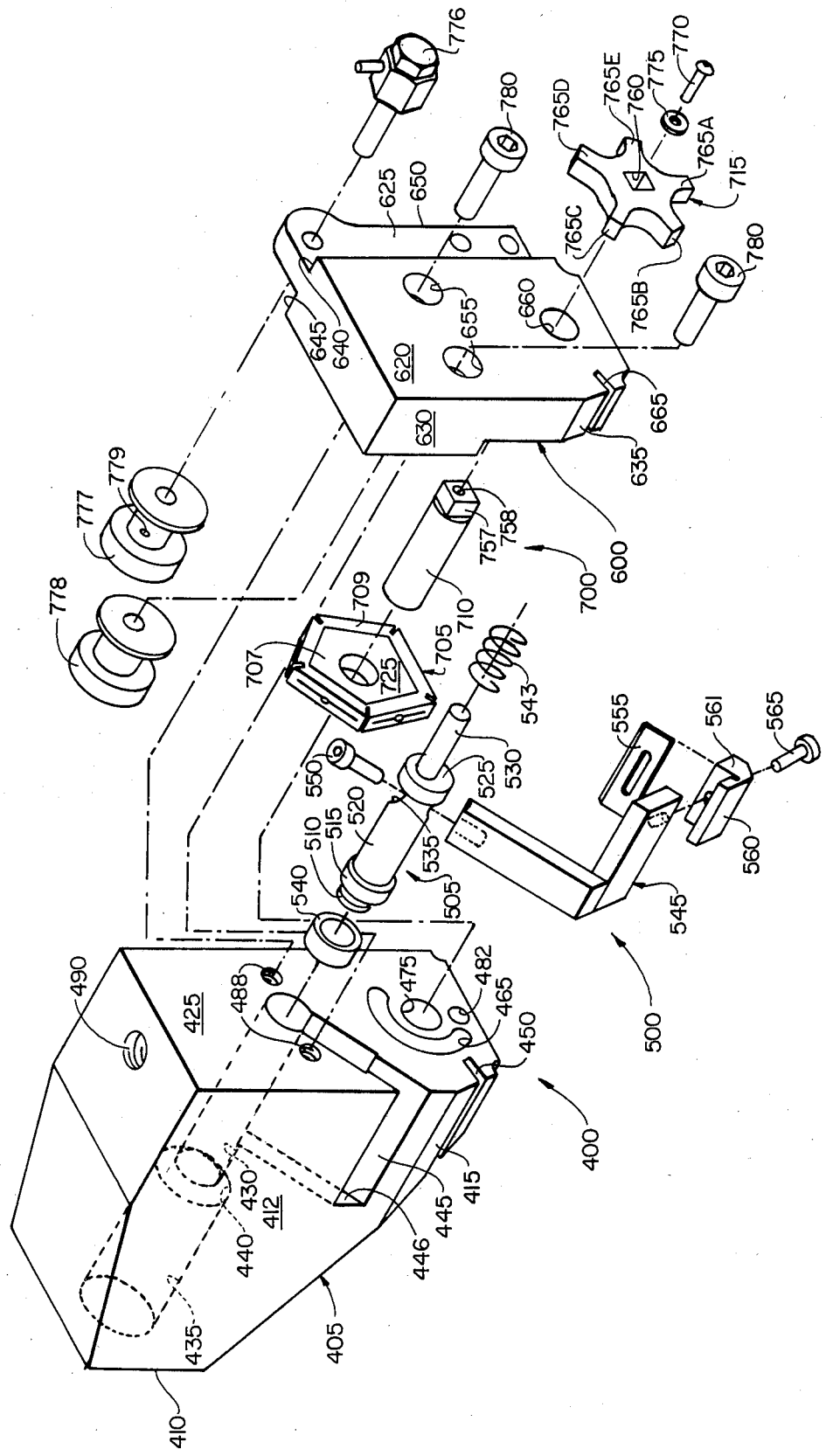
FIGS. 3A and 3B are enlargements of portions of FIG. 3.

Looking first at FIG. 1, there is shown a novel splicing tape dispenser-applicator or splicer 5 which comprises a mounting plate 100, a pawl assembly 200, an actuator assembly 300, and an applicator assembly 400. Splicer 5 is adapted to be mounted to the front panel 10 of a tape winding machine in order that it may apply a piece of splicing tape 15 to the abutting ends of a pair of subject tapes 20 and 23 which reside on a pair of splicing blocks 25A and 25B so as to effectively splice together the same.

Looking now at FIGS. 1, 2, 3 and 3B, mounting plate 100 has a flat top surface 110, a pair of flat parallel side surfaces 115A and 115B, and a pair of flat coplanar bottom surfaces 120. The front and rear sides of mounting plate 100 are dissimilar from one another.

The front side of mounting plate 100 is shown in detail in FIG. 2 and comprises a raised peripheral front surface portion 125 and a recessed interior front surface portion 130. The raised peripheral portion 125 and the recessed interior portion 130 together define a front channel having a pair of parallel side surfaces 135 and a top surface 140. The recessed interior portion 130 terminates in a bottom edge surface 145 having a U-shaped upwardly-extending recess 150.

Figure 3B:
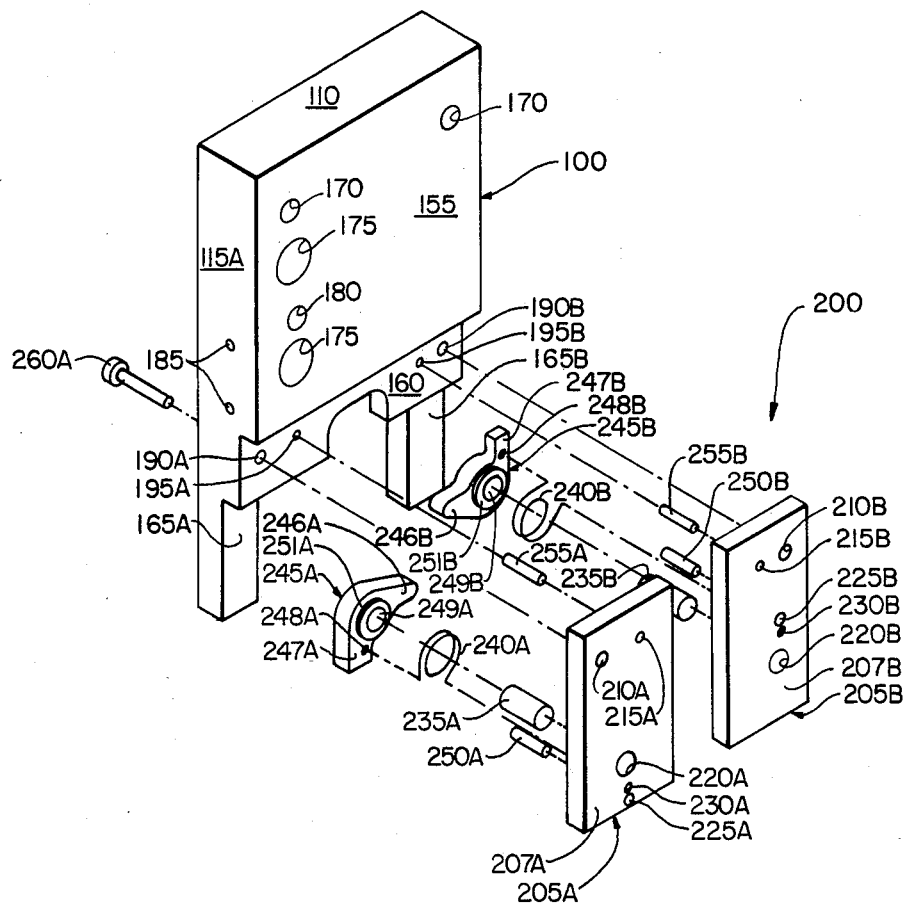

The rear side of mounting plate 100 is shown in detail in FIGS. 3 and 3B. It has a stepped configuration which includes an upper rear surface portion 155, an intermediate rear surface portion 160, and a pair of coplanar lower front surface portions 165A and 165B.

Mounting plate 100 also includes a plurality of through holes and blind holes. More particularly, mounting plate 100 includes a pair of parallel threaded holes 170 which extend between front surface portion 125 and rear surface portion 155, a pair of parallel smooth mounting holes 175 and a threaded mounting hole 180 which extend between front surface portion 130 and rear surface portion 155, a pair of parallel threaded blind holes 185 which extend inward from side surface 115A, a pair of parallel smooth holes 190A and 190B which extend between front surface portion 125 and rear intermediate surface portion 160, and a pair of smooth holes 195A and 195B which extend between front surface portion 130 and rear intermediate surface portion 160.

Still looking now at FIGS. 1, 2, 3 and 3B, pawl assembly 200 comprises a pair of similar but not identical pawl subassemblies 205A and 205B. Looking first at pawl subassembly 205A, this subassembly comprises a rectangular pawl-retaining plate 207A having a threaded hole 210A and four smooth holes 215A, 220A, 225A and 230A. A pivot dowel 235A is press fitted into hole 220A. A coil spring 240A surrounds dowel 235A and has one end inserted in pawl plate hole 230A. A pawl 245A, having a first arm 246A, a second arm 247A (with a blind hole 248A formed therein) and a pivot hole 249A, is mounted on dowel 235A. Pawl 245A has a raised portion 251A surrounding pivot hole 249A which acts as a spacer for the pawl relative to plate 207A, and coil spring 240A has its other end inserted in the pawl's blind hole 248A. This arrangement allows pawl 245A to pivot on dowel 235A against the biasing action of spring 240A. A dowel 250A, press fitted into bore 225A, acts as a stop for pawl arm 247A, and spring 240A tends to hold arm 247A against the dowel stop. Thus, pawl 245A can pivot clockwise but not counterclockwise from the position shown in FIG. 3.

Pawl subassembly 205A is attached to the rear of mounting plate 100 by first press fitting a dowel 255A into mounting plate hole 195A, and thereafter pressing the pawl subassembly against the mounting plate so that the free end of dowel 255A is press fitted into the pawl plate's hole 215A, with the mounting plate's hole 190A being aligned with the pawl-retaining plate's hole 210A. A screw 260A is then passed through the mounting plate's hole 190A and screwed into the pawl plate's threaded hole 210A to secure the pawl subassembly 205A to the mounting plate. It is to be appreciated that the various parts of pawl subassembly 205A and mounting plate 100 are appropriately sized relative to one another such that pawl 245A will be free to pivot on dowel 235A in the manner previously described after pawl subassembly 205A has been attached to mounting plate 100.

Looking next at pawl subassembly 205B, this subassembly comprises a pawl-retaining plate 207B having a threaded hole 210B and four smooth holes 215B, 220B, 225B and 230B. A pivot dowel 235B is press fitted into hole 220B. A coil spring 240B surrounds dowel 235B and has one end inserted in the pawl plate hole 230B. A pawl 245B, having a first arm 246B, a second arm 247B (with a blind hole 248B formed therein) and a pivot hole 249B, is mounted on pivot dowel 235B. Pawl 245B has a raised portion 251B surrounding pivot hole 249B which acts as a spacer for the pawl relative to plate 207A, and coil spring 240B has its other end inserted in the pawl's blind hole 248B. This arrangement allows pawl 245B to pivot on dowel 235B against the biasing action of spring 240B. A dowel 250B, press fitted into hole 225B, acts as a stop for pawl arm 247B, and spring 240B tends to hold arm 247B against the stop dowel. Thus, pawl 245B can pivot clockwise but not counterclockwise from the position shown in FIG. 3.

Pawl subassembly 205B is attached to the rear of mounting plate 100 by first press fitting a dowel 255B into the mounting plate's hole 195B, and thereafter pressing the pawl subassembly against the mounting plate so that the free end of dowel 255B is press fitted into the pawl plate's hole 215B, with the mounting plate's hole 190B being aligned with the pawl plate's bore 210B. A screw (not shown, but comparable to screw 260A) is then passed through the mounting plate's hole 190B and screwed into the pawl plate's threaded hole 210B to secure pawl subassembly 205B to the mounting plate. It is to be appreciated that the various parts of pawl subassembly 205B and mounting plate 100 are appropriately sized relative to one another such that pawl 245B will be free to pivot on dowel 235B in the manner previously described after pawl subassembly 205B has been attached to mounting plate 100.

Looking next at FIGS. 1 and 3, actuator assembly 300 comprises a double-acting pneumatic actuator 305 and an actuator mounting block 310. Actuator 305 may be any one of the many double-acting pneumatic actuators well known in the art, e.g. it could be a double-acting pneumatic actuator of the sort manufactured by Tom Thumb of Ft. Wayne, Indiana. Actuator 305 comprises an actuator or piston rod 315 which is adapted to be reciprocated between a first retracted position and a second extended position by alternately applying pressurized air to one or the other of the actuator's air fittings 320 and 321, respectively. Actuator rod 315 is threaded at its free end. Actuator 305 also includes four mounting bolts 325 which are fitted with screw threads 330 at their free ends.

Actuator mounting block 310 is rectangular and comprises flat top, bottom, front and rear surfaces 331, 332, 333 and 334, respectively. A large smooth hole 335 extends through the block between its top and bottom surfaces 331 and 332. Four threaded blind holes 340 are disposed about hole 335 and extend downward into the block from top surface 331. Block 310 also includes a pair of parallel horizontal smooth holes 345 which extend between front and rear surfaces 333 and 334. Actuator 305 is secured to mounting block 310 by screwing the threaded ends 330 of the mounting bolts 325 into the block's threaded blind holes 340. When actuator 305 is mounted to block 310 in this manner, the actuator rod 315 extends down through block 310 via the hole 335. Hole 335 is oversized relative to rod 315. Mounting block 310 is in turn affixed to mounting plate 100 by means of a pair of screws 350 which pass through the block's holes 345 and are screwed into the mounting plate's threaded holes 170.

Still looking at FIGS. 1, 3, and 3A, applicator assembly 400 comprises a mounting block 405, a cutter subassembly 500, a mounting bracket 600, and a wheel and ratchet subassembly 700.

As seen best in FIGS. 1, 3, 3A and 4, mounting block 405 comprises a front surface 410 (FIGS. 1 and 3), a pair of flat right side surfaces 412 and 415 (FIG. 3), a left side surface 420 (FIGS. 1 and 4), and a rear surface 425 (FIGS. 3 and 4). A smooth horizontal hole 430 extends forwardly from rear surface 425 and intersects a counterbore 435 extending rearward from front surface 410. A frustoconical shoulder 440 is located at the intersection of hole 430 and counterbore 435. An inclined slot 445 opening on side surface 412 and rear surface 425 intercepts bore 430. At its forward end slot 445 terminates at a surface 446. Another shorter and shallower inclined slot 450 opening on side surface 415 extends inward into the block from rear surface 425. A bore 455 (FIG. 1) extends between front counterbore 435 and a counterbore 460 extending inward from side surface 420. An arcuate groove 465 (FIGS. 3 and 4) in rear surface 425 extends forward far enough to intersect an inclined bore 470 (FIG. 4) which has a counterbore 471 extending inward from side surface 420. Mounting block 405 also has a blind hole 475 (FIGS. 3, 3A and 4) in rear surface 425 which is coaxial with arcuate groove 465. Still another hole 482 (FIGS. 3 and 4) extends forward from rear surface 425 to where it intercepts an inclined bore 485 (FIG. 4). Bore 485 in turn intercepts an inclined counterbore 486 extending inward from side surface 420. Mounting block 405 also includes a pair of threaded blind holes 488 (FIG. 3) which extend forward from rear surface 425, and a threaded blind hole 490 (FIG. 3) which extends downward into the block from the block's top surface.

Still looking at FIGS. 1, 3 and 4, a hollow tubular liner 492 (FIG. 1) is press fitted into counterbore 435 of mounting block 405, so that the liner's internal surface 493 is aligned with hole 430. The liner has a side hole 494 aligned with the block's side hole 455. Air hose fittings 495, 496 and 497 (FIGS. 1 and 4) are disposed in counterbores 460, 471 and 486, respectively, so as to communicate with bores 455, 470 and 485, respectively.

Looking next at FIGS. 1, 3 and 3A, cutter subassembly 500 comprises a cylindrical piston 505 having a front reduced diameter section 510, a front collar 515, a center reduced diameter section 520, a rear collar 525, and a rear reduced diameter section 530. A radial bore 535 extends through center section 520. A rubber cap 540 is mounted on the piston's front section 510. Rubber cap 540, front collar 515 and rear collar 525 all have an outside diameter just slightly smaller than the inside diameters of the mounting block's bore 430 and the bore 493 of liner 492. A coil spring 543 surrounds the piston's rear section 530 and abuts rear collar 525. Spring 543 is sized so that it extends beyond the end of the piston's rear section 530 when the spring is in an uncompressed state. An L-shaped arm 545 is attached to piston 505 by a screw 550 which passes through piston bore 535 and is screwed into a tapped hole in one end of the arm. A blade 555 is captivated to the other end of arm 545 by a blade cap 560 which has a portion 561 that underlies the blade and holds it against arm 545, and a screw 565 which passes through a hole in blade 555 and screws into a threaded hole in arm 545.

Still looking at FIGS. 1 and 3, the assembled cutter subassembly 500 is received and supported by mounting block 405. More specifically, piston 505 is disposed in block bore 430 so that the front end of the piston resides in bore liner 492, cutter arm 545 resides in block slot 445, and blade 555 resides in block slot 450. The various parts of cutter subassembly 500 and block 405 are sized so that when cutter arm 545 contacts the front surface 446 of block slot 445, piston cushion 540 resides inside liner 492 behind the liner's side hole 494 and cutter blade 555 resides in slot 450 forward of the block's rear surface 425.

Looking next at FIGS. 3 and 5, mounting bracket 600 of applicator assembly 400 is formed with dissimilar front and rear sides. The front side of mounting bracket 600 is shown in detail in FIG. 5 and comprises a first surface section 605, a second surface section 610, and a third surface section 615. The rear side of mounting bracket 600 is shown in detail in FIG. 3 and comprises a first rear surface section 620 and a second rear surface section 625. The right side of mounting bracket 600 comprises a pair of angulated side surfaces 630 and 635 (FIG. 3) which correspond in size and shape to the mounting block's two angulated right side surfaces 412 and 415, respectively. The left side of the mounting bracket comprises two inner edge surfaces 640 and 645 and an outer edge surface 650 (FIG. 3). A pair of parallel smooth holes 655 extend between front surface 605 and rear surface 620, a smooth blind hole 658 extends inward from front surface 605, and a smooth hole 660 extends between front surface 610 and rear surface 620. A slot 665, corresponding in size and shape to the mounting block's slot 450, extends between the bracket's front surface 610 and rear surface 620 and opens on side edge surface 635. As seen in FIG. 5, three holes 670, 675 and 680 extend from the bracket's front surface 615 to its rear surface 625. Holes 670 and 680 are threaded.

Looking next at FIGS. 3, 6 and 7, wheel and ratchet subassembly 700 comprises an applicator wheel 705, a cylindrical axle or pivot shaft 710, and a ratchet wheel 715. Applicator wheel 705 is pentagonal in shape, and is formed out of a rigid metallic core 707 and a resilient peripheral rim cover 709. Wheel 705 includes a front side 720 (FIG. 6), a rear side 725 (FIG. 3), five peripheral faces 730A–730E (FIG. 6) and a center hole 735. Five parallel blind holes 740A–740E (FIG. 6) extend rearward from front side 720 and intercept five radial bores 745A–745E, respectively, which extend inward from peripheral faces 730A–730E, respectively. Face slits 750A–750E (FIGS. 6 and 7) are formed in peripheral faces 730A–730E, respectively, and intercept radial bores 745A–745E, respectively. Corner slits 755AB–755EA are formed at the intersections of the wheel's peripheral faces. Axle 710 includes a rectangular rear end 757 (FIG. 3) having an axial blind hole 758 formed therein. Ratchet wheel 715 in turn comprises a rectangular center opening 760 for receiving the rectangular rear end of axle 710, and five equally-spaced teeth or arms 765A–765E.

Wheel and ratchet subassembly 700 is mounted to mounting bracket 600 (FIG. 5). More particularly, axle 710 is rotatably received in bracket hole 660 so that the rectangular rear end of the axle projects rearward from the bracket. Applicator wheel 705 is press fitted onto the front end of axle 710 so that it rests adjacent to but spaced from the bracket's front surface 610, and will rotate as a unit with the axle. Ratchet wheel 715 is secured to the rear end of axle 710 by fitting the axle's rectangular rear end 757 into the ratchet's rectangular center opening 760 and holding it there with a a washer 775 and a screw 770 that is screwed into the tapped hole 758 in axle 710. Ratchet 715 resides adjacent to and slightly spaced from the bracket's rear surface 620 and will rotate as a unit with axle 710 and applicator wheel 705. It is to be appreciated that applicator wheel 705 and ratchet wheel 715 are attached to axle 710 so that the applicator wheel's faces 730A–730E are aligned with the arms 765A–765E of ratchet wheel 715.

Mounting bracket 600 also includes an air hose fitting 776 and two tape bearings 777 and 778. Air hose fitting 776 is mounted in bracket bore 670 and has tape bearing 777 mounted thereon by means of a screw (not shown) which is screwed into a tapped axial hole in fitting 776. Tape bearing 777 includes a radial bore 779 which communicates with the interior of air fitting 776 through a radial hole (not shown) in that fitting. Tape bearing 778 is attached to bracket 600 via a screw (not shown) which passes through threaded bore 680. As seen in FIGS. 1 and 3, tape bearings 777 and 778 are disposed on the front side of mounting bracket 600.

Mounting bracket 600 and wheel and ratchet subassembly 700 are attached to mounting block 405 (and cutter subassembly 500) by screws 780 (FIG. 3) which pass through bracket holes 655 and screw into threaded holes 488 formed in the rear surface 425 of block 405. The front end of axle 710 is slidably received in block hole 475 so that the applicator wheel's front side 720 makes a close sliding fit with rear surface 425 of block 405. The rear end 530 of piston 505 is located in bracket hole 658 (FIG. 5), so that spring 543 urges piston 505 forward into hole 430 and away from bracket 600. Spring 543 normally biases the cutter subassembly 500 sufficiently far forward that cutter arm 545 engages the front wall 446 of side slot 445.

Actuator assembly 400 operates as a single assembly. When wheel and ratchet subassembly 700 is disposed so that, for example, the applicator wheel's corner slit 755EA faces directly downward (FIG. 12A), the hole 482 of block 405 will not be in communication with any of the applicator wheel's blind holes 740A-740E, the block's arcuate slit 465 will be in communication with the applicator wheel's holes 740A-740C, and the rear surface 425 of block 405 will close off the applicator wheel's holes 740D and 740E. Accordingly, if suction should be applied to the fitting 497 (FIG. 4) while wheel and ratchet subassembly 700 is disposed in the foregoing position, the suction will not make its way to any of the applicator wheel's surfaces 730A-730E. At the same time, however, if suction should be applied to fitting 496 (FIG. 4) while wheel and ratchet subassembly 700 is disposed in the foregoing position, the suction will be transmitted to the applicator wheel's surfaces 730A-730C via, in turn, bore 470, arcuate slit 465, axial wheel holes 740A-740C, radial wheel holes 745A-745C, and face slits 750A-750C. No suction will be transmitted to the applicator wheel's surfaces 730D and 730E from fitting 496 while wheel and ratchet subassembly 700 is disposed in the aforementioned position.

Furthermore, when the wheel and ratchet subassembly 700 is disposed so that applicator wheel face 730A and the ratchet arm 765A both face directly downward (FIG. 12C), the hole 482 of block 405 will be in communication with the applicator wheel's hole 740A, the arcuate slit 465 of block 405 will be in communication with the applicator wheel's holes 740B-740D, and the rear surface 425 of block 405 will close off the applicator wheel's hole 740E. Accordingly, if suction is applied to the fitting 497 (FIG. 4) while wheel and ratchet subassembly 700 is disposed in the foregoing position, the suction will be transmitted along bore 485 (FIG. 4), out block hole 482 (FIG. 3), in axial wheel hole 740A (FIG. 6), down radial wheel hole 745A, and out face slit 750A. At the same time, if suction is applied to the fitting 496 (FIG. 4) while wheel and ratchet assembly 700 is disposed in the foregoing position, the suction will be transmitted to the applicator wheel's surfaces 730B-730D via, in turn, bore 470, arcuate slit 465, wheel holes 740B-740D, wheel holes 745B-745D, and face slits 750B-750D.

When wheel and ratchet subassembly 700 is disposed so that the applicator wheel's corner slit 755EA faces directly downward (FIG. 12A), its corner slit 755AB will be aligned with the block's slit 450 and with the cutter assembly's cutter blade 555, and when wheel and ratchet subassembly 700 is disposed so that the applicator wheel's face 730A faces directly downward (FIG. 12C), none of the applicator wheel's corner slits will be aligned with the block's slot 450 and with the cutter assembly's cutter blade 555.

In addition to the foregoing, spring 543 normally keeps cutter subassembly 500 biased forward against front wall 446 of the block's slot 445 so that cutter blade 555 is disposed in block slot 450 and withdrawn from applicator wheel 705. However, the application of pressurized air to fitting 495 (FIG. 1) will drive piston 505 rearward against the force of spring 543 so as to extend cutter blade 555 rearward into bracket slot 665. It is to be appreciated also that when wheel and ratchet subassembly 700 is disposed so that one of the applicator wheel's corner slits is aligned with the block's slot 450 and with the cutter assembly's cutter blade 555, and pressurized air is thereafter applied to fitting 495 to drive piston 505 rearward so that cutter blade 555 will extend rearward into bracket slot 665, the moving cutter blade will pass through the corner slit of applicator wheel 705.

Applicator assembly 400 is mounted with its rear side against mounting plate 100, so that the rear surface 620 of bracket 600 rests against the mounting plate's recessed front surface 130, the side surfaces 630 and 640 of bracket 600 rest against the mounting plate's two inside surfaces 135, and the rear surface 625 of bracket 600 rests against the mounting plate's upraised front surface 125. When the applicator assembly is so mounted relative to the mounting plate, the threaded end of actuator rod 315 is screwed into threaded bore 490 of block 405 and locked in place with a nut 800 (FIG. 1).

Figure 9:
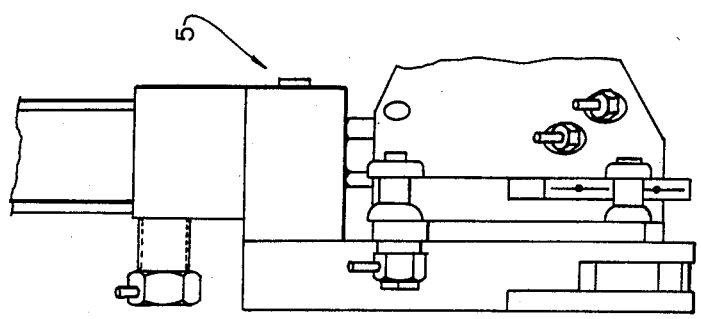
FIG. 9 is a side elevational view of the left side of the same dispenser-applicator, with the device's applicator assembly being shown in its first retracted position.
Figure 11:
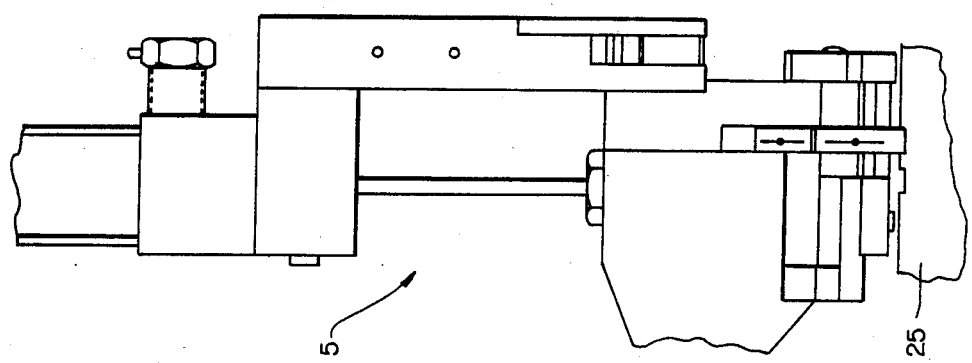
FIG. 11 is a side elevational view of the right side of the same dispenser-applicator, with the device's applicator assembly being shown in its second extended position.

It is to be appreciated that with applicator assembly 400 mounted to actuator assembly 300 in the foregoing manner, reciprocation of actuator rod 315 will cause the entire applicator assembly to reciprocate vertically within the front channel in mounting plate 100. As this reciprocation occurs, downward movement of the applicator assembly from its first retracted position (FIGS. 8 and 9) to its second extended position (FIGS. 10 and 11) will result in the engagement of pawl 246B with one of the ratchet wheel arms 765A-765E. As a result, the ratchet wheel will be advanced in a counterclockwise direction (as viewed in FIG. 3) so that applicator wheel 705 is advanced one half face, whereby one of the wheel's faces is presented downward when the actuator arm is fully extended, rather than a corner of the wheel as when the actuator arm is fully retracted. Similarly, upward movement of the applicator assembly from its second extended position (FIGS. 10 and 11) to its first retracted position (FIGS. 8 and 9) will result in the engagement of pawl 246A with one of the arms 765A-765E of ratchet wheel 715. As a result, the ratchet wheel will be advanced counterclockwise (as viewed in FIG. 3) so that applicator wheel 705 is advanced another one half face, whereby one of the wheel's corners is presented downward when the actuator arm is fully retracted, rather than a face of the wheel as when the actuator arm is fully extended.

The entire splicer 5 is mounted to the front panel 10 of a tape winding machine by a pair of locating studs (not shown) which extend outward from the front side of panel 10 and are received in mounting plate holes 175 (FIG. 2). The splicer is secured in place by passing a screw (not shown) forwardly through a hole in the front of the machine panel (not shown) and screwing it into the mounting plate's threaded hole 180. It is to be appreciated that when the splicer is mounted to the tape winding machine in the foregoing manner, and the applicator assembly is disposed in its first retracted position, the applicator assembly will be above and spaced from the two splicing blocks 25A and 25B, in the manner shown in in FIGS. 8 and 9, and when the applicator assembly is moved into its second extended position, the applicator assembly will be in engagement with the tapes 20 and 23 supported by splicing blocks 25A and 25B, in the manner shown in FIGS. 10 and 11. After the splicer has been secured to the winding machine's front panel in the manner described above, the dispenser-applicator's air hose fittings 320, 321 and 495 are connected by hoses (not shown) and solenoid valves (also not shown) to a source of high pressure air. Similarly, the dispenser-applicator's air hose fittings 496, 497 and 776 (FIG. 3) are selectively coupled to hoses (not shown in FIGS. 1-13) leading to suction.

Operation of the splicing tape dispenser-applicator will now be described. For convenience of description, it is assumed that the applicator assembly is initially disposed in its first retracted position (FIG. 8), with the applicator wheel arranged so that its corner slit 755EA is directed downward towards splicing blocks 25A and 25B and its corner slit 755AB is aligned with the retracted cutter blade 555 (FIG. 12A), and with all of the pressurized air and vacuum lines leading to the dispenser-applicator turned off.

Figure 10:
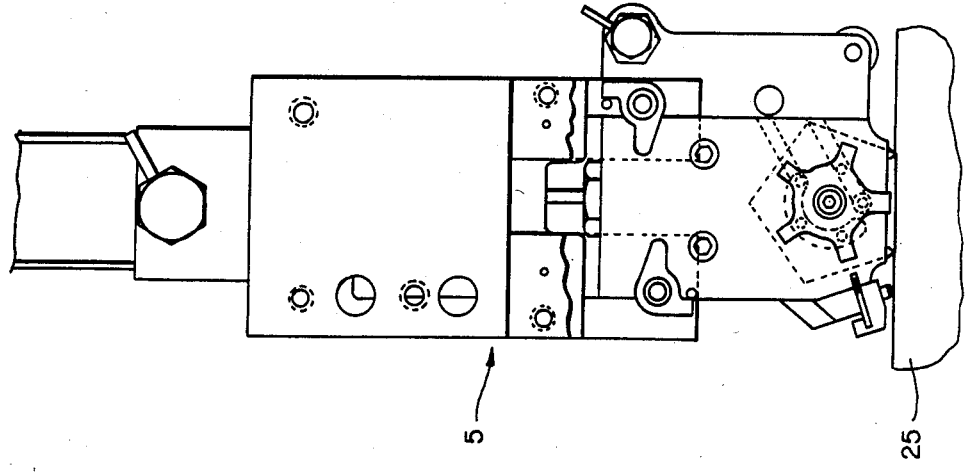
FIG. 10 is a partial rear elevational view of the same dispenser-applicator, with the device's applicator assembly being shown in its second extended position.

The splicer is first prepared for use. This task is accomplished by mounting a roll of splicing tape 15 on a roll holder (not shown) mounted to front panel 10 of the tape winding machine, and then threading the free end of the splicing tape down around tape bearings 777 and 778 and up over faces 730D-730A of the applicator wheel (FIGS. 1 and 12A). Then, as the free end of the splicing tape is held taut by the operator, suction is applied to fittings 776, 496 and 497 so that suction is established on bearing 777 and wheel faces 730C-730A to grip the splicing tape thereto. Next, a brief blast of pressurized air is applied to fitting 495 (FIG. 1). This causes cutter blade 555 to (a) move rearward so that it severs the splicing tape at wheel corner 755AB, and (b) then return back into its retracted position clear of the applicator wheel (FIG. 12B). The severed piece of splicing tape remains affixed to wheel face 730A, and the remainder of the splicing tape remains affixed to wheel faces 730C and 730D, on account of the fact that vacuum is continuously being applied to fitting 496. Then pressurized air is applied to actuator fitting 321 so as to cause the applicator assembly to be driven from its first retracted position to its second extended position. As this occurs, ratchet wheel arm 765D engages pawl 245B and thereby advances the applicator wheel one half face, with the result that wheel face 730A is presented downward as the applicator assembly reaches its second extended position and contacts splicing block 25A and 25B (FIGS. 10 and 12C).

Figure 8:
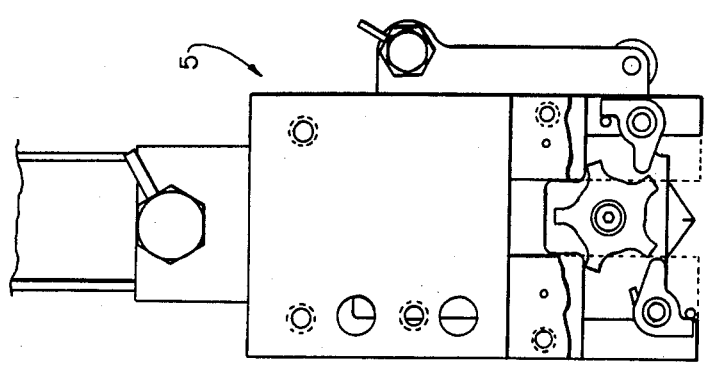
FIG. 8 is a rear elevational view of the same dispenser-applicator, with the device's applicator assembly being shown in its first retracted position.

The suction being applied to fittings 496 and 497 is maintained throughout the applicator assembly's downward stroke, and inasmuch as this suction is transmitted to applicator wheel 705 via the arcuate opening 465 and the circular opening 482, gripping suction is established on wheel face 730D on the downward stroke shortly after the stroke begins, and is maintained on wheel faces 730C-730A throughout the stroke, so that the rotation of applicator wheel 705 causes the splicing tape engaging faces 730D-730A to be advanced as the severed piece of splicing tape is being delivered to the splicing blocks. Then the application of air to actuator 305 is reversed, so that pressurized air is applied to actuator fitting 320 to cause the applicator assembly to be driven from its second extended position back to its first retracted position. As this occurs, applicator wheel 705 lifts away from the severed piece of splicing tape (which remains affixed to the splicing blocks on account of the adhesive material carried by the splicing tape), and ratchet wheel arm 765B thereafter engages pawl 245A and thereby advances the applicator wheel another one half face, so that wheel corner 755AB is presented downward as the applicator assembly reaches its first retracted position (FIGS. 8, 12D and 13A). Once again, since the suction being applied to fitting 496 is maintained throughout this upward stroke and since the suction is transmitted to applicator wheel 705 via the arcuate opening 465, gripping suction is maintained on wheel faces 730D-730B throughout the upward stroke, so that the rotation of applicator wheel 705 causes the splicing tape engaging wheel faces 730D-730B to be advanced also. The severed piece of splicing tape deposited on the splicing block is subsequently removed as waste. At this point, the splicing tape dispenser-applicator is ready for use.

Thereafter, when it is desired to splice together the abutting ends of two subject tapes 20 and 23 which are disposed on splicing blocks 25A and 25B, respectively, a brief blast of pressurized air is applied to fitting 495. This causes cutter blade 555 to (a) move rearward to sever the splicing tape at wheel corner 755BC, and (b) then return back into its retracted position clear of the applicator wheel (FIG. 13B). The severed portion of splicing tape remains affixed to wheel face 730B, and the remainder of the splicing tape remains affixed to wheel faces 730C and 730D, on account of the fact that vacuum is continuously being applied to fitting 496 (FIG. 4). Then a brief blast of pressurized air is applied to actuator fitting 321 so that the applicator assembly is driven from its first retracted position to its second extended position. As this occurs, ratchet arm 765E engages pawl 245B and advances the applicator wheel one half face, so that wheel face 730B is presented downward as the applicator assembly reaches its second extended position and contacts splicing block 25 (FIG. 13C). This brings the severed piece of splicing tape on wheel face 730B into contact with the two subject tapes 20 and 23 on splicing blocks 25A and 25B. Then a brief blast of pressurized air is applied to actuator fitting 320, whereby the applicator assembly is driven from its second extended position back to its first retracted position. As this occurs, the severed piece of splicing tape is separated from the withdrawing wheel face 730B, and thereafter ratchet arm 765C engages pawl 245A and advances the applicator wheel another one half face, so that wheel corner 755BC is presented downward as the applicator assembly reaches its first retracted position (FIG. 13D).

The foregoing cycle is repeated whenever it is desired to lay down a splice.

When the supply of splicing tape on the splicing tape roll is about to be exhausted, so that only enough splicing tape remains on the dispenser-applicator to make a few more splices, the loose trailing end of the splicing tape will fall away from tape bearing 777. As this occurs, the splicing tape will no longer serve to close off bore 779 of air fitting 776. Accordingly, appropriate control apparatus in the tape winding machine (which is adapted to periodically monitor the vacuum applied to air fitting 776) will recognize that the supply of splicing tape is about to be exhausted and will turn off the tape winding machine before the splicing tape dispenser-applicator runs completely out of splicing tape. A fresh roll of splicing tape may then be loaded in the manner previously described before splicing operations are resumed.

Figure 14:
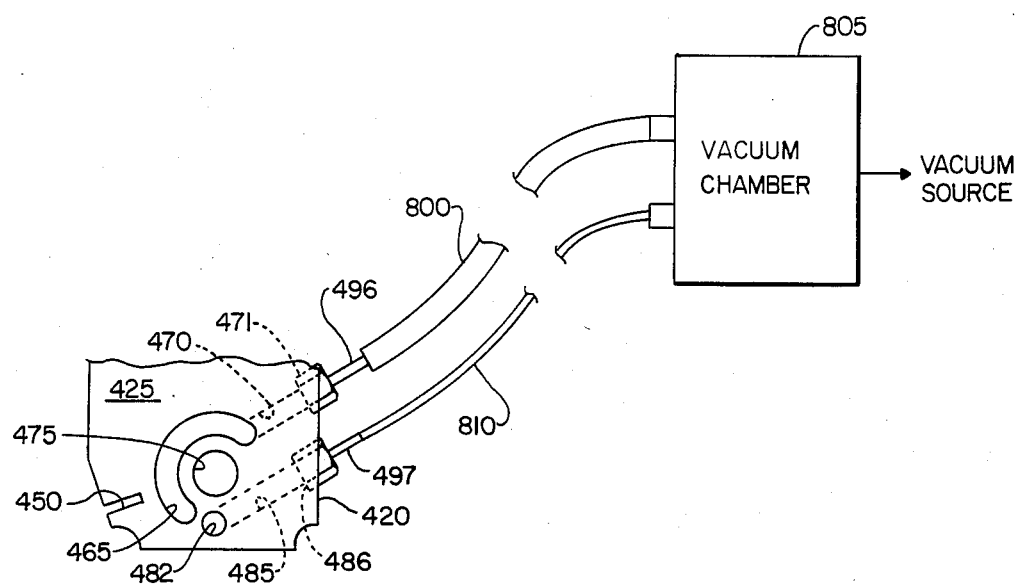
FIG. 14 is a representation illustrating the preferred manner of supplying suction to the applicator assembly's first and second air fittings.

The suction applied to fittings 496 and 497 may be from two independent sources. Preferably, however, suction is applied to fitting's 496 and 497 in the manner shown in FIG. 14, i.e., a first hose 800 is used to connect fitting 496 with a remote vacuum chamber 805, and a second hose 810 is used to connect fitting 497 with the same remote vacuum chamber. The diameter of second hose 810 is sized so as to be sufficiently small, relative to the size and vacuum level of vacuum chamber 805 and also relative to the diameter of first hose 800, so that the admission of air into vacuum chamber 805 via second hose 810 (occurring during the upward swing of applicator assembly 400, after applicator wheel 705 leaves the splicing block and before ratchet wheel 715 engages pawl 245B) will be at a rate sufficiently low so as to have substantially no adverse affect on the application of suction to fitting 496. It is preferred that vacuum chamber 805 be disposed on the tape winding machine, remote from splicer 5.

MODIFICATIONS OF THE PREFERRED EMBODIMENT

It is to be appreciated that the preferred embodiment described above may be modified without departing from the essence or scope of the present invention.

Thus, for example, the five-sided applicator wheel 705 may be replaced by an applicator wheel having a different number of sides, and the ratchet wheel 715 may be replaced by a ratchet having a different number of arms or teeth. Of course, it is to be appreciated that the applicator wheel must always have the same number of sides as the ratchet has arms or teeth.

It is also contemplated that pneumatic actuator 305 could be replaced by an equivalent electrical component, e.g. a solenoid. Similarly, the knife assembly may be operated electrically rather than pneumatically.

Figure 16:
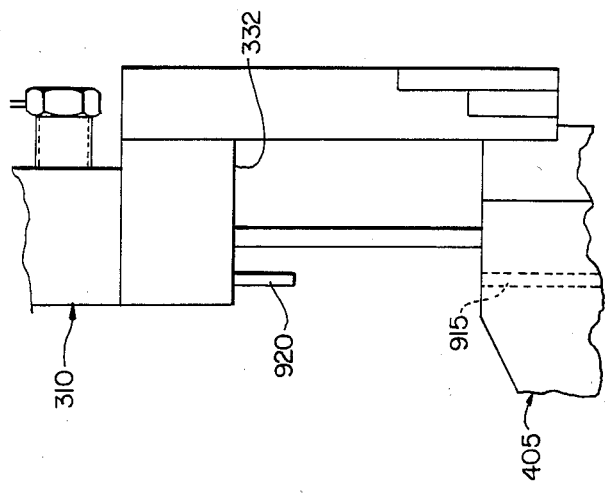
FIG. 16 is a partial side elevational view of the right side of the alternative embodiment of the dispenser-applicator.
Figure 15:
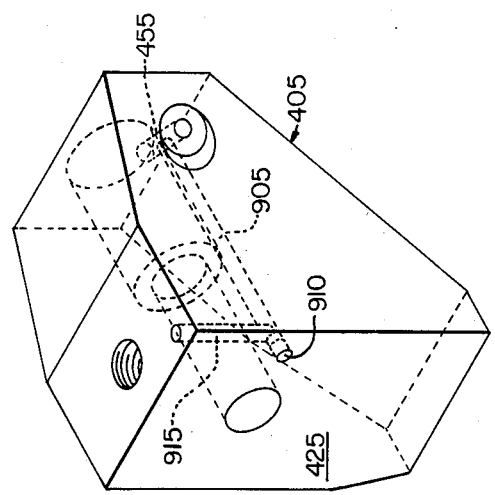
FIG. 15 is a rear isometric view of a portion of an alternative embodiment of the dispenser-applicator.

A further modification involves provision of means for preventing operation of cutter subassembly 500 unless the applicator assembly has returned all the way to its first retracted position. Thus, as shown in FIGS. 15 and 16, the applicator block 405 may have an alternative embodiment which includes a horizontal bore 905 that extends forward from the block's rear surface 425 and intersects the block's side bore 455. Additionally, a plug 910 closes off the rear end of bore 905, and a vertical bore 915 extends downward from the top of the block so as to intersect bore 905. Actuator block 310 in turn has a pin 920 (FIG. 16) extending downward out of its lower surface 332. Pin 920 is sized and located so that it will reside in and close off the applicator block's vertical bore 915 when the applicator assembly has returned completely to its first retracted position, but it will not reside in nor close off the block's bore 915 when the applicator assembly is not fully disposed in its first retracted position. Consequently, if a brief blast of pressurized air is supplied to air fitting 495 (FIG. 1) when the applicator assembly is in any position other than its first retracted position, the pressurized air will escape out the top of the block via bores 905 and 915 without driving cutter subassembly 500 forward. However, if a brief blast of pressurized air should be supplied to air fitting 495 when the applicator assembly is completely disposed in its first retracted position, pin 920 will close off bore 915 so that the pressurized air will be contained to drive cutter subassembly 500 forward.

These and changes of their type will be obvious to a person skilled in the art, and are considered to be well within the scope of the present invention.

ADVANTAGES OF THE INVENTION

Numerous advantages are obtained by employing the present invention rather than the prior art.

First, the present invention provides a splicing tape dispenser-applicator which is compact and which occupies a relatively small "footprint" on the front panel of the tape winding machine.

Second, the present invention provides a splicing tape dispenser-applicator which has a relatively simple design, so that it is relatively easy to manufacture and relatively inexpensive to produce.

Third, the present invention provides a splicing tape dispenser-applicator which has a relatively simple operating sequence, so that it is relatively easy to integrate the device with the tape winding machine's control apparatus.

Fourth, the present invention provides a splicing tape dispenser-applicator which is relatively fast and reliable in operation.

Fifth, the present invention provides a splicing tape dispenser-applicator which requires a minimum of maintenance.

Sixth, the present invention provides a splicing tape dispenser-applicator which does not suffer from unreliable tape advance, especially when utilizing relatively narrow splicing tape.

And seventh, the present invention provides a splicing tape dispenser-applicator of the type wherein it is a relatively fast and simple task to hand-thread the splicing tape onto the dispenser-applicator, as must be done whenever a fresh roll of splicing tape is required.

What I claim is:

1. A splicing tape dispenser-applicator for sequentially and repeatedly dispensing an adhesive splicing tape from a supply roll thereof, severing a predetermined length of said splicing tape, and applying said severed length of splicing tape to the abutting ends of two tapes to be spliced disposed on a splicing block, said dispenser-applicator comprising:
   (a) a base plate;
   (b) a pawl assembly mounted to said base plate comprising first and second pawls, said first pawl being adapted to yield in a first direction but not in a second opposite direction, and said second pawl being adapted to yield in said second opposite direction but not in said first direction;
   (c) an actuator assembly mounted to said base plate and comprising an actuator having an actuator arm adapted to reciprocate axially; and
   (d) a splicing tape applicator assembly mounted to said actuator arm so that said applicator assembly will reciprocate between a first retracted position and a second extended position when said actuator arm reciprocates axially, said applicator assembly comprising:
   (1) a mounting member;
   (2) splicing tape cutter means mounted to said mounting member comprising a cutter blade and means for reciprocating said cutter blade between a first forward position and a second rearward position;
   (3) a mounting bracket mounted to said mounting member;
   (4) a rotatable multi-faced applicator wheel for feeding splicing tape from a supply roll and applying a severed length of said splicing tape to the abutting ends of two tapes that are to be spliced;
   (5) a rotatable multi-tooth ratchet wheel;
   (6) means mounting said applicator wheel and said ratchet wheel to said mounting bracket so that rotational movement of said ratchet wheel will cause corresponding rotational movement of said applicator wheel; and
   (7) air passageway means formed in said applicator assembly and arranged so that (a) when said applicator assembly is disposed in its first retracted position, suction is applied to at least a selected face of said applicator wheel that is positioned to next apply a section of splicing tape to the two tapes to be spliced, whereby said suction will hold a severed length of splicing tape to said selected face, and (b) as said applicator assembly is moved to its second extended position, the application of suction to said selected face will be maintained so as to keep said severed length of splicing tape held to said selected face by suction;

said applicator assembly being positioned relative to said pawl assembly so that when said applicator assembly advances from its first retracted position to its second extended position, said ratchet wheel will engage said first pawl and said first pawl will rotatively advance said applicator wheel one half face in a predetermined direction, and when said applicator assembly advances from its second extended position to its first retracted position, said ratchet wheel will engage said second pawl and said second pawl will rotatively advance said applicator wheel one half face in the same predetermined direction, whereby each complete reciprocation cycle of said applicator assembly will rotatively step said applicator wheel forward one complete face.

2. A splicing tape dispenser-applicator according to claim 1 wherein said applicator assembly is further arranged so that when said applicator assembly is disposed in its first retracted position, said applicator wheel will be disposed so that one of its corners is directed in a first direction and another of its corners will be aligned with said cutter blade, and when said applicator assembly is disposed in its second extended position, said applicator wheel will be disposed so that one of its faces will be directed in said first direction and none of its corners will be aligned with said cutter blade.

3. A splicing tape dispenser-applicator according to claim 2 wherein said base plate includes a bottom edge surface having a U-shaped upwardly-extending recess formed therein, and further wherein one of the teeth of said multi-tooth ratchet wheel is disposed in said recess when said applicator assembly is disposed in its first retracted position.

4. A splicing tape dispenser-applicator according to claim 1 wherein some of said air passageway means are formed in said mounting block and some of said air passageway means are formed in said applicator wheel.

5. A splicing tape dispenser-applicator according to claim 4 wherein the said air passageway means formed in said block comprise an arcuate groove and an axial bore.

6. A splicing tape dispenser-applicator according to claim 5 wherein said arcuate groove is connected to a source of suction by first air-transfering means and said axial bore is connected to a source of suction by second air-transfering means.

7. A splicing tape dispenser-applicator according to claim 4 wherein said air passageway means formed in said applicator wheel comprise a plurality of axial bores extending from the front side of said applicator wheel into the wheel, and a plurality of radial bores extending from the faces of said applicator wheel into the wheel, said axial and radial bores intersecting one another.

8. A splicing tape dispenser-applicator for severing a selected length of adhesive splicing tape from a supply roll of said tape and applying said severed selected length of splicing tape to the abutting ends of a pair of tapes to be spliced positioned on a splicing block assembly, said splicing tape dispenser-applicator comprising:

(a) a mounting plate;
(b) a selectively operable actuator mounted to said mounting plate comprising an actuator arm and selectively operable means for reciprocating said arm along a selected path;
(c) an applicator assembly mounted to said actuator arm so that said applicator assembly will reciprocate between a first retracted position and a second extended position with reciprocating movement of said actuator arm along said selected path, said applicator assembly comprising:
  (1) support means connected to and movable with said actuator arm;
  (2) splicing tape cutter means affixed to said support means comprising a cutter blade adapted for reciprocal movement between a first forward position and a second rearward position, and selectively operable means for reciprocating said cutter blade;
  (3) a rotatable applicator wheel having a plurality of faces arranged in series about its periphery and at least one aperture formed in each of said faces;
  (4) means rotatably mounting said applicator wheel to said support means;
  (5) a ratchet wheel mounted to and movable with said support means, said ratchet wheel having a plurality of uniformly spaced teeth and being connected to said applicator wheel so that rotational movement of said ratchet wheel will cause corresponding rotational movement of said applicator wheel;
  (6) means coupling said ratchet wheel and said applicator wheel so that they will rotate as a unit;
  (7) suction applying means comprising at least first and second passageways adapted for connection to a source of suction;
  (8) flow control means arranged for selectively connecting said first and second passageways to said apertures in said applicator wheel faces in accordance with rotation of said applicator wheel, whereby (a) when said applicator assembly is disposed in its first retracted position, suction applied to said first passageway will be applied automatically to a plurality of said applicator wheel faces including at least one selected applicator wheel face which will next engage the splicing block and suction applied to said second passageway will not be delivered to any of said applicator wheel faces, and (b) when said applicator assembly is disposed in its second extended position, suction applied to said first passageway will be applied automatically to a plurality of said applicator wheel faces but not to at least one selected applicator wheel face disposed so as to engage the splicing block, and suction applied to said second passageway will be applied to said selected applicator wheel face; and
(d) pawl means comprising first and second pawls rotatably mounted to said mounting plate, spring means urging said first pawl to rotate in a first direction and said second pawl to rotate in a second opposite direction, and means limiting rotation of said first and second pawls in said first and second directions, respectively;

said ratchet wheel being disposed for engagement by said first and second pawls as said applicator assembly is reciprocated, said first pawl being disposed so that when said applicator assembly advances from its first retracted position to its second extended position, said first pawl will engage said ratchet wheel and cause said ratchet wheel to rotate sufficiently to cause said applicator wheel to advance one half face in a predetermined direction, and said second pawl being disposed so that when said applicator assembly advances from its second extended position to its first retracted position, said second pawl will engage said ratchet wheel and cause said ratchet wheel to rotate sufficiently to cause said applicator wheel to rotate sufficiently to cause said applicator wheel to advance said one half face in the same predetermined direction, whereby each complete reciprocation of said applicator assembly will step said applicator wheel forward one complete face, said applicator assembly and said pawls also being arranged so that when said applicator assembly is disposed in its first retracted position, said applicator wheel will be disposed so that one of its corners will be directed toward said splicing block assembly and another of its corners will be aligned with said cutter blade, and when said applicator assembly is disposed in its second extended position, said applicator wheel will be disposed so that one of its faces will be oriented parallel to and confronting said splicing block assembly.

9. A splicing tape dispenser-applicator according to claim 8 wherein some of said flow control means are formed in said support means and some of said flow control means are formed in said applicator wheel.

10. A splicing tape dispenser-applicator according to claim 9 wherein said flow control means formed in said support means comprises an arcuate groove and an axial bore, and said flow control means formed in said applicator wheel are adapted to mate with said arcuate groove so as to provide communication between said flow control means formed in said applicator wheel and said arcuate groove as said applicator wheel is rotated.

11. A splicing tape dispenser-applicator according to claim 10 wherein said flow control means formed in said applicator wheel comprise a plurality of first bores extending parallel to the axis of said applicator wheel, and a plurality of second bores that extend radially of said applicator wheel and intersect said first bores.

12. A splicing tape dispenser-applicator according to claim 8 wherein said first and second pawls are disposed so as to engage said ratchet wheel at substantially diametrically opposed points as said applicator assembly is reciprocated.

13. A splicing tape dispenser-applicator according to claim 8 wherein said support means comprises a mounting member attached to said actuator arm, and a bracket attached to said mounting member, and further wherein said pawls are attached to said mounting plate and said applicator wheel is attached to said mounting member.

* * * * *